(12) United States Patent
Raman et al.

(10) Patent No.: US 11,587,741 B2
(45) Date of Patent: Feb. 21, 2023

(54) COMPOSITIONS AND METHODS FOR ENERGY STORAGE DEVICE ELECTRODES

(71) Applicant: Tesla, Inc., Austin, TX (US)

(72) Inventors: Santhanam Raman, San Diego, CA (US); James Borkenhagen, Spring Valley, CA (US); Xiaomei Xi, Carlsbad, CA (US); Xiang-Rong Ye, San Diego, CA (US)

(73) Assignee: Tesla, Inc., Austin, TX (US)

( * ) Notice: Subject to any disclaimer, the term of this patent is extended or adjusted under 35 U.S.C. 154(b) by 0 days.

(21) Appl. No.: 17/173,748

(22) Filed: Feb. 11, 2021

(65) Prior Publication Data

US 2021/0193398 A1    Jun. 24, 2021

Related U.S. Application Data

(62) Division of application No. 15/443,939, filed on Feb. 27, 2017, now Pat. No. 10,923,295.

(Continued)

(51) Int. Cl.
*H01G 11/42*    (2013.01)
*H01G 11/50*    (2013.01)
(Continued)

(52) U.S. Cl.
CPC ............ *H01G 11/42* (2013.01); *H01G 11/06* (2013.01); *H01G 11/28* (2013.01); *H01G 11/38* (2013.01);
(Continued)

(58) Field of Classification Search
CPC .. H01M 10/0525; H01M 4/625; H01M 4/587; H01G 11/52; H01G 11/50; H01G 11/42; H01G 11/86

(Continued)

(56) References Cited

U.S. PATENT DOCUMENTS 5,744,258 A    4/1998    Bai
6,914,769 B2   7/2005    Welsch
(Continued)

FOREIGN PATENT DOCUMENTS

CN    102723211    10/2012
JP    10-106540     4/1998
(Continued)

OTHER PUBLICATIONS

Li et al., Jan. 2016, Evaluation residual moisture in lithium-ion battery electrodes and its effect on electrode performance, 2015 MRS Fall Meeting, 7 pp.

(Continued)

*Primary Examiner* — Arun Ramaswamy
(74) *Attorney, Agent, or Firm* — Knobbe Martens Olson & Bear, LLP

(57) ABSTRACT

An energy storage device can include a cathode, an anode, and a separator between the cathode and the anode, where the anode and/or electrode includes an electrode film having a super-fibrillized binder material and carbon. The electrode film can have a reduced quantity of the binder material while maintaining desired mechanical and/or electrical properties. A process for fabricating the electrode film may include a fibrillization process using reduced speed and/or increased process pressure such that fibrillization of the binder material can be increased. The electrode film may include an electrical conductivity promoting additive to facilitate decreased equivalent series resistance performance. Increasing fibrillization of the binder material may facilitate formation of thinner electrode films, such as dry electrode films.

20 Claims, 9 Drawing Sheets

Related U.S. Application Data

(60) Provisional application No. 62/302,056, filed on Mar. 1, 2016.

(51) Int. Cl.

| | |
|---|---|
| *H01G 11/86* | (2013.01) |
| *H01M 4/587* | (2010.01) |
| *H01M 4/62* | (2006.01) |
| *H01M 10/0525* | (2010.01) |
| *H01G 11/38* | (2013.01) |
| *H01G 11/28* | (2013.01) |
| *H01G 11/06* | (2013.01) |
| *H01M 4/04* | (2006.01) |
| *H01M 4/133* | (2010.01) |
| *H01G 11/52* | (2013.01) |

(52) U.S. Cl.
CPC ............ *H01G 11/50* (2013.01); *H01G 11/52* (2013.01); *H01G 11/86* (2013.01); *H01M 4/043* (2013.01); *H01M 4/0416* (2013.01); *H01M 4/133* (2013.01); *H01M 4/587* (2013.01); *H01M 4/621* (2013.01); *H01M 4/625* (2013.01); *H01M 10/0525* (2013.01); *Y02E 60/13* (2013.01)

(58) Field of Classification Search
USPC ................ 361/502, 503, 508, 516; 429/232; 29/25.03
See application file for complete search history.

(56) References Cited

U.S. PATENT DOCUMENTS

| | | | |
|---|---|---|---|
| 7,295,423 B1 | 11/2007 | Mitchell | |
| 7,307,830 B2 * | 12/2007 | Gallay | H01G 9/08 |
| | | | 429/231.1 |
| 7,486,498 B2 | 2/2009 | Welsch | |
| 7,508,651 B2 | 3/2009 | Mitchell | |
| 8,072,734 B2 | 12/2011 | Zhong | |
| 10,923,295 B2 | 2/2021 | Raman et al. | |
| 2004/0170821 A1 | 9/2004 | Iwaida et al. | |
| 2005/0250011 A1 * | 11/2005 | Mitchell | H01M 4/1391 |
| | | | 429/217 |
| 2006/0146475 A1 | 7/2006 | Zhong | |
| 2006/0246343 A1 | 11/2006 | Mitchell | |
| 2010/0014215 A1 * | 1/2010 | Zhong | H01M 4/0409 |
| | | | 252/502 |
| 2013/0157141 A1 * | 6/2013 | Zhong | H01M 4/622 |
| | | | 252/502 |
| 2013/0309527 A1 * | 11/2013 | Liu | H01G 11/86 |
| | | | 977/734 |
| 2015/0062779 A1 | 3/2015 | Bankaitis | |
| 2015/0072234 A1 | 3/2015 | Mitchell | |
| 2015/0255779 A1 | 9/2015 | Hong | |
| 2015/0303481 A1 | 10/2015 | Duong | |

FOREIGN PATENT DOCUMENTS

| | | |
|---|---|---|
| JP | 2000-279777 | 10/2000 |
| JP | 3884702 B2 | 7/2004 |
| JP | 2011-258333 | 12/2011 |
| JP | 2015-146249 | 8/2015 |
| JP | 2018-515171 | 6/2018 |
| WO | WO 05/008807 | 1/2005 |
| WO | WO 07/062126 | 11/2006 |
| WO | WO 12/151341 | 11/2012 |
| WO | WO 14/138242 | 9/2014 |

OTHER PUBLICATIONS

Wood et al., 2017, Technical and economic analysis of solvent-based lithium-ion electrode drying with water and NMP, Drying Technology, 11 pp.

* cited by examiner

| Name | Chemical name | Surface area (m²/g) | Ash (%) | Particle size (μm) | Evaluation comments |
|---|---|---|---|---|---|
| MP01 | Mesoporous carbon | 50-100 | <0.05 | <0.5 | No ESR improvement |
| MP02 | Mesoporous carbon | | | 4.1 | No ESR improvement |
| CC01 | Conductive carbon | 24 | <0.1 | 9.8 | 5% improvement in ESR |
| CC02 | Conductive carbon | 16.5 | 0.05 | 6.5 | No ESR improvement |
| CC03 | Conductive carbon | | | 0.1 | No ESR improvement |
| CC04 | Conductive carbon | 50 | | <0.5 | ~5% ESR improvement |
| CC05 | Conductive carbon | | | <1 | No ESR improvement |

FIG. 3

| Cell ID | Binder (wt%) | film t (um) | Cap (F) | ESR (mohm) |
|---|---|---|---|---|
| Cell #1 | 8 | 80 | 2393 | 3.1 |
| Cell #2 | 8 | 80 | 2418 | 2.9 |
| Cell #3 | 8 | 80 | 2409 | 3.0 |
| Cell #4 | 8 | 80 | 2412 | 3.0 |
| Cell #5 | 8 | 80 | 2420 | 3.0 |
| Cell#6 | 7 | 60 | 2421 | 2.10 |
| Cell#7 | 7 | 60 | 2393 | 2.09 |
| Cell#8 | 7 | 60 | 2406 | 2.13 |
| Cell#9 | 7 | 60 | 2416 | 2.08 |
| Cell#10 | 7 | 60 | 2380 | 2.01 |
| Cell#11 | 6.5 | 50 | 2234 | 1.83 |
| Cell#12 | 6.5 | 50 | 2253 | 1.81 |
| Cell#13 | 6.5 | 50 | 2258 | 1.8 |
| Cell#14 | 6.5 | 50 | 2234 | 1.81 |
| Cell#15 | 6.5 | 50 | 2236 | 1.85 |

FIG. 7

COMPOSITIONS AND METHODS FOR ENERGY STORAGE DEVICE ELECTRODES

STATEMENT REGARDING FEDERALLY SPONSORED R&D

This invention was made with government support under DEFC2605NT42403 awarded by the United States Department of Energy. The government has certain rights in the invention.

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present invention relates to energy storage devices, particularly to compositions of and methods for electrodes of energy storage devices.

Description of the Related Art

Various types of energy storage devices can be used to power electronic devices, including for example, capacitors, batteries, capacitor-battery hybrids and/or fuel cells. An energy storage device, such as a lithium ion capacitor, having an improved electrode composition can facilitate improved capacitor electrical performance.

SUMMARY

For purposes of summarizing the invention and the advantages achieved over the prior art, certain objects and advantages of the invention are described herein. Not all such objects or advantages may be achieved in any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

In a first aspect, an electrode for use in an energy storage device comprising a free-standing dry electrode film, is provided herein, comprising dry carbon particles; and dry super-fibrillized binder particles; and a current collector.

In an embodiment of the first aspect, the dry electrode film has a thickness of about 50 μm to about 120 μm. In an embodiment of the first aspect, the electrode is an anode. In an embodiment of the first aspect, the free-standing dry electrode film further comprises a conductive carbon. In an embodiment of the first aspect, the electrode film comprises the conductive carbon in about 1% to about 5% by mass. In an embodiment of the first aspect, the electrode is in ionic contact with an electrolyte comprising a lithium salt. In an embodiment of the first aspect, the electrolyte is further in ionic contact with a cathode. In an embodiment of the first aspect, the dry super-fibrillized binder particles comprise about 3 wt % to about 7 wt % of the free-standing dry electrode film. In an embodiment of the first aspect, a lithium ion capacitor is provided, comprising the electrode.

In a second aspect, a method for fabricating a dry energy storage device electrode film is provided, comprising forming a first dry electrode mixture comprising dry carbon particles and dry fibrillizable binder particles; super-fibrillizing the binder in the dry electrode film mixture to form a super-fibrillized matrix within the electrode film mixture; and calendaring the super-fibrillized electrode film mixture to form a free-standing super-fibrillized electrode film.

In an embodiment of the second aspect, wherein the method is a dry method in which substantially no processing additives are used. In an embodiment of the second aspect, the method further comprises contacting the free-standing electrode film with a current collector to form a first electrode. In an embodiment of the second aspect, the method further comprises forming a second electrode, and inserting a separator between the first electrode and the second electrode. In an embodiment of the second aspect, the first electrode is an anode. In an embodiment of the second aspect, the free-standing dry electrode film has a thickness of about 50 μm to about 120 μm. In an embodiment of the second aspect, the dry super-fibrillized binder particles comprise about 3 wt % to about 7 wt % of the super-fibrillized matrix. In an embodiment of the second aspect, forming the first mixture further comprises adding conductive carbon particles to the first mixture. In an embodiment of the second aspect, the first mixture comprises the conductive carbon particles in about 1% to about 5% by mass. In an embodiment of the second aspect, super-fibrillizing the binder comprises: fibrillizing the binder in the dry electrode film mixture to form a first fibrillized matrix; destructuring the first fibrillized matrix to form a powdered mixture of carbon particles and fibrillized binder particles; and fibrillizing the powdered mixture to form a second fibrillized matrix, wherein the second fibrillized matrix comprises the super-fibrillized matrix.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and other features, aspects, and advantages of the present disclosure are described with reference to the drawings of certain embodiments, which are intended to illustrate certain embodiments and not to limit the invention.

FIG. 3 is a table listing respective equivalent series resistance performance of lithium ion capacitor cells with anodes comprising different types of electrical conductivity promoting additives.

FIG. 7 provides tabular data for various embodiments of lithium ion capacitors having an anode created by the methods provided herein.

DETAILED DESCRIPTION

Figure 1:
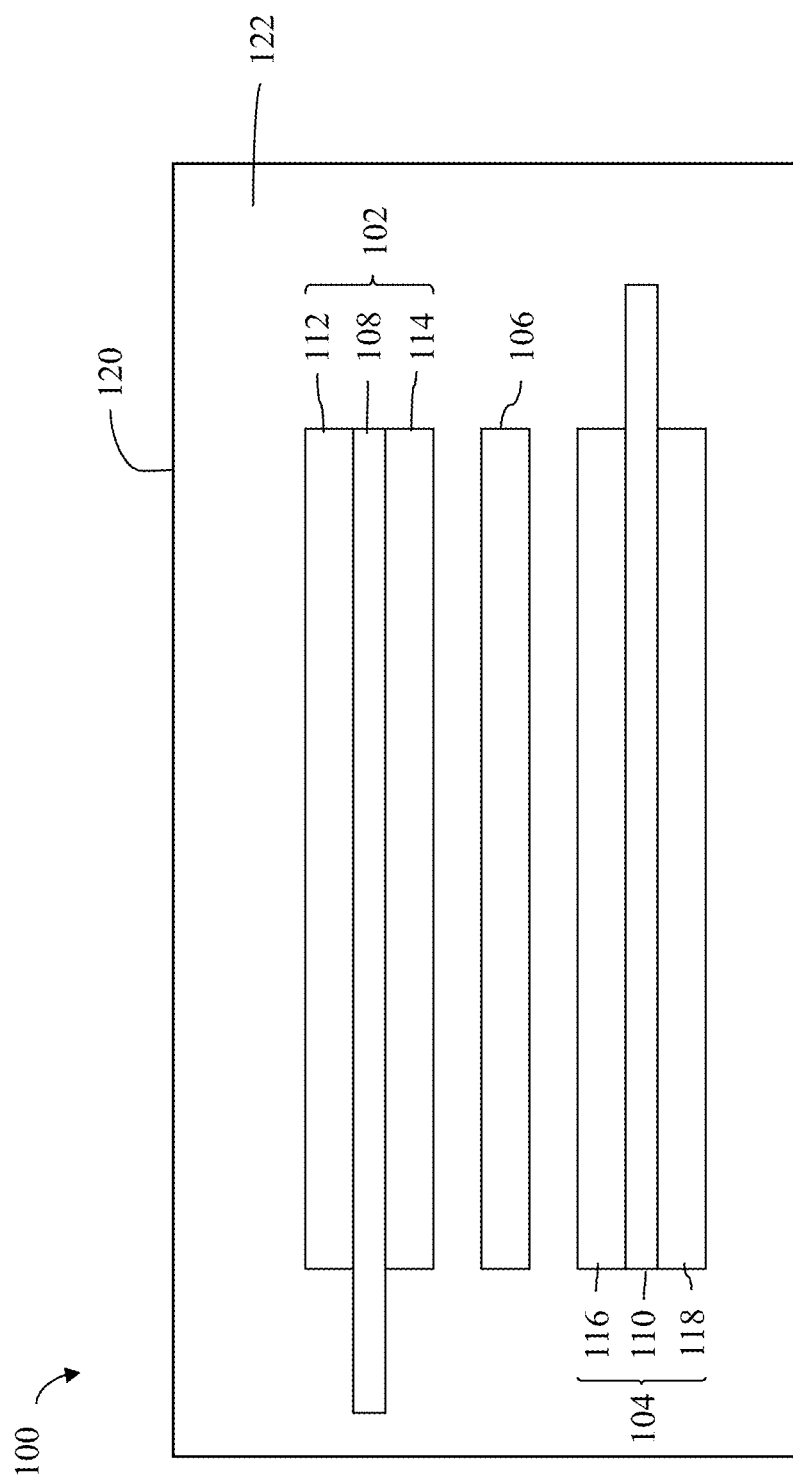
FIG. 1 shows a side cross-sectional schematic view of an example of an energy storage device, according to one embodiment.

Although certain embodiments and examples are described below, those of skill in the art will appreciate that the invention extends beyond the specifically disclosed embodiments and/or uses and obvious modifications and equivalents thereof. Thus, it is intended that the scope of the invention herein disclosed should not be limited by any particular embodiments described below.

In some embodiments, an energy storage device, such as a lithium ion capacitor (LiC), with improved electrical and/or mechanical performance characteristics is provided. In some embodiments, the device can have an electrode comprising an improved electrode film composition, which in turn can provide improved electrical and/or mechanical performance. In some embodiments, the electrode can be an anode and/or cathode.

Embodiments herein can comprise mixtures of materials for electrode films, electrode films, electrodes, energy storage devices, and related methods, having increased fibrillization of binder material, relative to conventional processes, or "super-fibrillization" as described further and defined herein. A number of electrical and/or mechanical performance advantages may be realized by increasing binder fibrillization.

For instance, binder adherence and thus film strength may be increased by increasing binder fibrillization. Such embodiments can allow fabrication of thinner films using the same or less amount of binder than a comparable film with binder that is not as fibrillized. Using thinner films can be beneficial for dry electrode film technology, which conventionally have had thicker films than wet electrode processes, due to the free-standing nature of the dry electrode films and other factors. Additionally, any decrease in the percentage of binder by weight ("binder loading") in proportion to some of the other materials, such as conductive materials, in an electrode film has electrical performance benefits. For example, use of super-fibrillized binder and reduced binder loading in an electrode film can also decrease the undesirable Electrical Series Resistance (ESR) in a device using the film, relative to conventional films with conventionally fibrillized binder.

In some embodiments, an electrode film of the anode and/or cathode may comprise a fibrillizable binder material and another electrode material, such as carbon. The electrode film can have a reduced quantity of the binder material while maintaining desired mechanical properties. Such desired mechanical properties may relate to, for example, the mechanical properties needed for one or more steps of a fabrication process for an energy storage device. For example, when an electrode is manufactured using a dry fabrication process, a freestanding electrode film can advantageously provide sufficient stability to be rolled, handled, etc., prior to adhering the film to a current collector. Further, increasing fibrillization of the binder material may advantageously facilitate formation of thinner electrode films which can withstand the calendar line tension. In some embodiments, electrode films comprising an increased number of fibrils, greater fibril surface area, and/or longer fibrils may have a reduced thickness while demonstrating sufficient mechanical strength to maintain desired film integrity during fabrication of the film.

A process for fabricating the electrode film may comprise a fibrillization process using reduced speed and/or increased process pressure, such that fibrillization of the binder material can be increased, relative to previously known conventional electrode film fibrillization processes. For example, increased fibrillization may provide an increased number of fibrils, greater fibril surface area, and/or longer fibrils from the binder material such that desired mechanical properties can be maintained while using a reduced quantity of binder material, relative to previously known conventional electrode film fibrillization processes. It is believed that such increased number of fibrils, greater fibril surface area, and/or longer fibrils allow a more efficient matrix structure in an electrode film, thus providing one or more advantages described herein. In some embodiments, the more efficient matrix structure can result in an electrode film with increased tensile strength in length, resistance to shear, compressive, and/or twisting stress, decreased film thickness, increased film density, and reduced binder loading, relative to previous dry electrode techniques. In certain embodiments, the electrode film is a free-standing electrode film having a reduced binder loading as provided herein.

In certain embodiments, the electrode film is a free-standing electrode film comprising a super-fibrillized binder particles and carbon particles. As provided herein, super-fibrillized binder particles are binder particles fabricated according to the processes herein, such as process 200 and/or 400, including binder particles that are fibrillized, reduced, and then re-fibrillized; binder particles that are fibrillized at a higher pressure, lower speed, lower feed rate, and/or longer duration than conventional fibrillization techniques; super-fibrillized binder particles can be structurally defined based upon the number of fibrils, fibril surface area, and/or fibril length, all of which are increased relative to conventional binder fibrillization techniques. As provided herein, a super-fibrillized matrix is the structure formed by the constituents of an electrode film mixture in which the binder particles have been super-fibrillized, which have a level of adhesion with each other, due to the fibrillization process, but which have not yet been compressed into an electrode film, for example, as depicted in FIG. 6B.

In some embodiments, the super-fibrillized binder particles are characterized by a greatest dimension of less than about 3 microns ($\mu m$), less than about 2 $\mu m$, less than about 1 $\mu m$, less than about 0.5 $\mu m$, less than about 0.3 $\mu m$, less than about 0.1 $\mu m$, less than about 0.05 $\mu m$, less than about 0.03 $\mu m$, less than about 0.01 $\mu m$, or values therebetween, for example, about 0.01 to 3 $\mu m$, about 0.03 to 2 $\mu m$, about 0.05 to 1 $\mu m$, or about 0.1 to 0.3 $\mu m$. In further embodiments, super-fibrillized matrix comprises carbon particles having at least 10%, at least 20%, at least 30%, at least 40%, at least 50%, at least 60%, at least 70%, at least 80%, at least 90%, at least 95%, or at least 99% surface area in contact with binder particles, or a range of values therebetween. In some embodiments, the super-fibrillized binder particles are present in an electrode film in at least twice the number compared to conventional dry process electrode film of equivalent binder mass.

Conventional dry electrode films formed using a dry process from dry particle electrode film mixtures fabricated using standard techniques, with conventionally fibrillized binder generally are characterized by a thickness of greater than or equal to about 120 $\mu m$ for anodes, and greater than or equal to about 80 $\mu m$ for cathodes. The differences in thicknesses between these two types of dry electrodes are attributed to the following: anode electrode films may be more difficult to compress than cathode electrode films, for example due at least in part to difficulty in compressing carbon material of the anode, such as compared to activated carbon of the cathode electrode film. Generally, such conventional cathode films can range from about 80 μm to about 10,000 μm, and such anode films can range from about 120 μm to about 10,000 μm.

In some embodiments, increasing fibrillization of the binder material, relative to conventional dry electrode processes, may facilitate formation of thinner electrode films. Advantageously, thinner electrode films can be used in lithium ion capacitors occupying less volume. In some embodiments, super-fibrillization of the binder material may facilitate formation of cathode electrode films with a thickness of less than or equal to about 80 μm, 60 μm, or even 50 μm, while maintaining or increasing structural integrity and/or electrical performance, relative to otherwise similar conventional dry electrode films with conventionally fibrillized dry-binder material. In some embodiments, an electrode film fabricated using one or more processes described herein can have a thickness less than or equal to about 120 μm, 80 μm, 60 μm, and even about 50 μm, where the electrode is optionally an anode. In some embodiments, increasing fibrillization of the binder material may facilitate formation of anode electrode films with a thickness less than 120 microns (μm). In some embodiments, increasing fibrillization of the binder material may facilitate formation of thinner electrode films, such as electrode films of a thickness less than 120 microns (μm), 80 μm, 60 μm, less than 50 μm, less than 40 μm, or less than 30 μm, including anode electrode films less than 120 μm, and even lower, and cathode electrode films less than 120 μm, 80 μm, and even lower. In some embodiments, thinner electrode films can provide improved lithium ion capacitor power capabilities. In some embodiments, an anode for use in a lithium ion capacitor comprises an electrode film having a thickness of about 40 μm to about 120 μm, about 50 μm to about 120 μm, about 50 μm to about 80 μm, about 60 μm to about 100 μm, or about 80 μm to about 120 μm. In some embodiments, a cathode for use in a lithium ion capacitor comprises an electrode film having a thickness of about 40 μm to about 80 μm, about 40 μm to about 70 μm, about 50 μm to about 80 μm, about or about 50 μm to about 70 μm.

In some embodiments, the electrode film comprises an electrical conductivity promoting additive to facilitate decreased equivalent series resistance performance. The additive may be a carbon black and/or graphite. In some embodiments, the electrode film comprises a reduced quantity of the binder material and an increased quantity of one or more electrical conductivity promoting additives, relative to previously known conventional electrode films, such that embodiments of the present electrode films can demonstrate decreased equivalent series resistance while maintaining desired mechanical properties.

A lithium ion capacitor comprising one or more electrodes having an electrode film composition described herein may advantageously demonstrate reduced equivalent series resistance, thereby providing a capacitor with increased power density, relative to previously known conventional electrode films. In some embodiments, improved equivalent series resistance performance may facilitate reduced heat generation, thereby reducing or avoiding thermal dissipation of lithium ion capacitors comprising conventional electrode films. In some embodiments, lithium ion capacitors comprising one or more electrodes having electrode film compositions described herein may be cheaper to fabricate. In some embodiments, lithium ion capacitors comprising one or more electrode compositions described herein can have a variety of shapes, including prismatic, cylindrical and/or button shaped. In some embodiments, a lithium ion capacitor comprising an electrolyte as described herein can be used to power hybrid electric vehicles (HEV), plug-in hybrid electric vehicles (PHEV), and/or electric vehicles (EV) vehicles.

It will be understood that although the electrodes and energy storage devices herein may be described within a context of lithium ion capacitors, the embodiments can be implemented with any of a number of energy storage devices and systems, such as one or more batteries, capacitors, capacitor-battery hybrids, fuel cells, combinations thereof, and the like, with or without lithium. In some embodiments, the electrode is a cathode or an anode configured for use in an ultracapacitor, a lithium ion capacitor, or a lithium ion battery. In preferred embodiments, the electrode is an anode configured for use in a lithium ion capacitor.

FIG. 1 shows a side cross-sectional schematic view of an example of an energy storage device 100. The energy storage device 100 may be a lithium ion capacitor. Of course, it should be realized that other energy storage devices are within the scope of the invention, and can include batteries, capacitor-battery hybrids, and/or fuel cells. The energy storage device 100 can have a first electrode 102, a second electrode 104, and a separator 106 positioned between the first electrode 102 and second electrode 104. For example, the first electrode 102 and the second electrode 104 may be placed adjacent to respective opposing surfaces of the separator 106. The first electrode 102 may comprise a cathode and the second electrode 104 may comprise an anode, or vice versa. The energy storage device 100 may include an electrolyte 122 to facilitate ionic communication between the electrodes 102, 104 of the energy storage device 100. For example, the electrolyte 122 may be in contact with the first electrode 102, the second electrode 104 and the separator 106. The electrolyte 122, the first electrode 102, the second electrode 104, and the separator 106 may be received within an energy storage device housing 120. For example, the energy storage device housing 120 may be sealed subsequent to insertion of the first electrode 102, the second electrode 104 and the separator 106, and impregnation of the energy storage device 100 with the electrolyte 122, such that the first electrode 102, the second electrode 104, the separator 106, and the electrolyte 122 may be physically sealed from an environment external to the housing. It will be understood that energy storage device 100 is shown as a dual-electrode, dual layer device, but other types can be implemented, such as single-layer electrodes.

The energy storage device 100 can include any of a number of different types of electrolyte 122. For example, device 100 can include a lithium ion capacitor electrolyte, which can include a lithium source, such as a lithium salt, and a solvent, such as an organic solvent. In some embodiments, a lithium salt can include lithium hexafluorophosphate ($LiPF_6$), lithium tetrafluoroborate ($LiBF_4$), lithium perchlorate ($LiClO_4$), lithium bis(trifluoromethansulfonyl) imide ($LiN(SO_2CF_3)_2$), lithium trifluoromethansulfonate ($LiSO_3CF_3$), combinations thereof, and/or the like. In some embodiments, a lithium ion capacitor electrolyte solvent can include one or more ethers and/or esters. For example, a lithium ion capacitor electrolyte solvent may comprise ethylene carbonate (EC), dimethyl carbonate (DMC), diethyl carbonate (DEC), ethyl methyl carbonate (EMC), vinyl carbonate (VC), propylene carbonate (PC), combinations thereof, and/or the like. For example, the electrolyte may comprise $LiPF_6$, ethylene carbonate, propylene carbonate and diethyl carbonate.

The separator 106 can be configured to electrically insulate two electrodes adjacent to opposing sides of the separator 106, such as the first electrode 102 and the second electrode 104, while permitting ionic communication between the two adjacent electrodes. The separator 106 can comprise a variety of porous electrically insulating materials. In some embodiments, the separator 106 can comprise a polymeric material. For example, the separator 106 can comprise a cellulosic material (e.g., paper), a polyethylene (PE) material, a polypropylene (PP) material, and/or a polyethylene and polypropylene material.

As shown in FIG. 1, the first electrode 102 and the second electrode 104 include a first current collector 108, and a second current collector 110, respectively. The first current collector 108 and the second current collector 110 may facilitate electrical coupling between the corresponding electrode and an external circuit (not shown). The first current collector 108 and/or the second current collector 110 can comprise one or more electrically conductive materials, and/or have various shapes and/or sizes configured to facilitate transfer of electrical charges between the corresponding electrode and a terminal for coupling the energy storage device 100 with an external terminal, including an external electrical circuit. For example, a current collector can include a metallic material, such as a material comprising aluminum, nickel, copper, silver, alloys thereof, and/or the like. For example, the first current collector 108 and/or the second current collector 110 can comprise an aluminum foil having a rectangular or substantially rectangular shape and can be dimensioned to provide desired transfer of electrical charges between the corresponding electrode and an external electrical circuit (e.g., via a current collector plate and/or another energy storage device component configured to provide electrical communication between the electrodes and the external electrical circuit).

The first electrode 102 may have a first electrode film 112 (e.g., an upper electrode film) on a first surface of the first current collector 108 (e.g., on a top surface of the first current collector 108) and a second electrode film 114 (e.g., a lower electrode film) on a second opposing surface of the first current collector 108 (e.g., on a bottom surface of the first current collector 108). Similarly, the second electrode 104 may have a first electrode film 116 (e.g., an upper electrode film) on a first surface of the second current collector 110 (e.g., on a top surface of the second current collector 110), and a second electrode film 118 on a second opposing surface of the second current collector 110 (e.g., on a bottom surface of the second current collector 110). For example, the first surface of the second current collector 110 may face the second surface of the first current collector 108, such that the separator 106 is adjacent to the second electrode film 114 of the first electrode 102 and the first electrode film 116 of the second electrode 104.

The electrode films 112, 114, 116 and/or 118 can have a variety of suitable shapes, sizes, and/or thicknesses. For example, the electrode films can have a thickness of about 30 microns (μm) to about 250 microns, including about 100 microns to about 250 microns.

In some embodiments, an electrode film, such as one or more of electrode films 112, 114, 116 and/or 118, can have a mixture comprising binder material and carbon. In some embodiments, the electrode film can include one or more additives, including electrical conductivity promoting additives. In some embodiments, the electrode film of a lithium ion capacitor cathode can comprise an electrode film mixture comprising one or more carbon based electroactive components, including for example a porous carbon material. In some embodiments, the porous carbon material of the cathode comprises activated carbon. For example, the electrode film of the cathode and can include a binder material, activated carbon and an electrical conductivity promoting additive. In some embodiments, the electrode film of a lithium ion capacitor anode comprises an electrode film mixture comprising carbon configured to reversibly intercalate lithium ions. In some embodiments, the lithium intercalating carbon is graphite. For example, the electrode film of the anode can include a binder material, graphite and an electrical conductivity promoting additive.

In some embodiments, the binder material can include one or more fibrillizable binder components. For example, a process for forming an electrode film can include fibrillizing the fibrillizable binder component such that the electrode film comprises fibrillized binder. In some embodiments, the fibrillized binder comprises super-fibrillized binder particles as provided herein. The binder component may be fibrillized to provide a plurality of fibrils, the fibrils desired mechanical support for one or more other components of the film. For example, a matrix, lattice and/or web of fibrils can be formed to provide desired mechanical structure for the electrode film. For example, a cathode and/or an anode of a lithium ion capacitor can include one or more electrode films comprising one or more fibrillized binder components. In some embodiments, a binder component can include one or more of a variety of suitable fibrillizable polymeric materials, such as polytetrafluoroethylene (PTFE), ultra-high molecular weight polyethylene (UHMWPE), and/or other suitable fibrillizable materials, used alone or in combination.

In some embodiments, the electrode film comprises a reduced quantity of the binder material by weight, relative to previously known conventional dry electrode films, while maintaining desired mechanical properties. In some embodiments, the electrode film comprises about 1 weight % to about 10 weight %, about 3 weight % to about 15 weight %, about 3 weight % to about 10 weight %, about 3 weight % to about 8 weight %, about 3 weight % to about 7 weight %, about 3 weight % to about 6 weight %, or about 3 weight % to about 5 weight %, of the binder material. In further embodiments, the electrode film is an anode comprising binder material in about 4 wt % to about 7 wt %, for example about 5 wt % to about 6 wt % or about 6.5 wt % to about 8 wt %. In some embodiments, the electrode film is a cathode comprising binder material in about 7 wt % to about 11 wt %, for example about 8 wt % to about 10 wt %, along with activated carbon. In some embodiments, the electrode film, such as the anode film, can comprise binder material that is less than about 4%, or even 3% by weight, for example, between about 0.5% and 4% by weight, 1% and 4% by weight, 0.5% and 3% by weight, or 1% and 3% by weight. In some embodiments, the electrode film comprising a reduced quantity of binder can maintain desired resistance to a tensile, shear, compressive, and/or twisting stress.

In some embodiments, the electrode film comprises a reduced quantity of binder material, relative to other materials in the film, facilitating the use of an increased quantity of the electrical conductivity promoting additive, improving electrical performance. For example, an anode implementing such an embodiment can demonstrate improved equivalent series resistance, while maintaining or even increasing desired mechanical properties. In some embodiments, particular types of electrical conductivity promoting additive can be included in the electrode film to provide desired electrical performance. For example, the electrode film comprising a reduced quantity of binder material may demonstrate desired resistance to a tensile, shear, compressive, and/or twisting stress, while demonstrating improved equivalent series resistance, thereby facilitating fabrication of an energy storage device, such as a lithium ion capacitor having increased power density, relative to previously known conventional energy storage devices of otherwise comparable structure.

In some embodiments, the electrical conductivity promoting additive comprises a conductive carbon. In some embodiments, the conductive carbon comprises one or more types of carbon black and/or graphite. In some embodiments, the one or more types of carbon black comprise commercially available Ketjenblack® from Akzo Nobvel N.V., C-NERGY™ Super C65 from Imerys Graphite & Carbon, Ltd., Super P® from Imerys Graphite & Carbon, Ltd., BP2000® from Cabot Corp., and/or LITX® 50 from Cabot Corp. In some embodiments, the one or more types of graphite comprise commercially available ABG1010 from Superior Graphite Co., and/or ABG1005 from Superior Graphite Co. For example, an anode electrode film of a lithium ion capacitor may include one or more of the electrical conductivity promoting additives described herein. In some embodiments, the conductive carbon can be about 1 weight % to about 10 weight % of the electrode film mixture, including about 1 weight % to about 8 weight %, or about 1 weight % to about 5 weight %. In some embodiments, including a conductive carbon, as provided herein, in the electrode film can result in an ESR improvement of about 5% relative to an energy storage device that does not include the conductive carbon. In further embodiments, the conductive carbon is characterized by a surface area of 10-100 $m^2/g$, for example 20-50 $m^2/g$, and/or a particle size of 0.1 to 10 µm. In still further embodiments, the conductive carbon is characterized by a particle size of about 0.1 µm to about 0.5 µm, or about 10 µm. In some embodiments, a lithium ion capacitor including an anode fabricated by the methods provided herein can be characterized by an ESR of about 0.1 mΩ to about 10 mΩ, for example, about 0.5 mΩ to about 5 mΩ, or about 1.5 mΩ to about 3.5 mΩ.

In some embodiments, one or more electrode films described herein can be fabricated using a dry fabrication process. As used herein, a dry fabrication process can refer to a process in which no or substantially no solvents are used in the formation of an electrode film. For example, components of the electrode film may comprise dry particles. The dry particles for forming the electrode film may be combined to provide a dry particles electrode film mixture. In some embodiments, the electrode film may be formed from the dry particles electrode film mixture using the dry fabrication process such that weight percentages of the components of the electrode film and weight percentages of the components of the dry particles electrode film mixture are similar or the same. In some embodiments, the electrode film formed from the dry particles electrode film mixture using the dry fabrication process may be free or substantially free from any processing solvents, and solvent residues resulting therefrom. In some embodiments, the electrode film formed from the dry particles electrode film mixture using the dry fabrication process can be cleaner and/or structurally stronger, and thereby providing improved electrochemical and/or mechanical performance. In some embodiments, the electrode films are free-standing dry particle electrode films formed using the dry process from the dry particles mixture. In some embodiments, a free-standing dry electrode film, consists essentially or consists of dry carbon particles and dry super-fibrillized binder particles. In some embodiments, only a single binder is used to form the free-standing dry electrode film, such as a single fibrillizable binder, such as PTFE.

In some embodiments, the energy storage device is not a battery.

Figure 2:
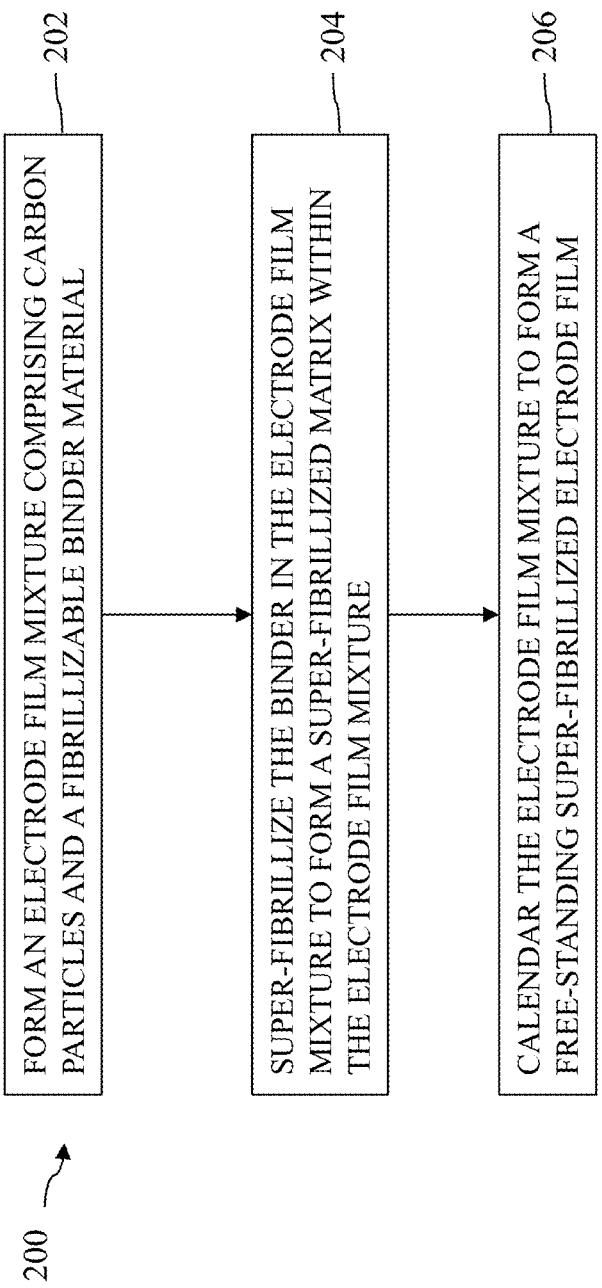
FIG. 2 is a process flow diagram showing an example of a process for fabricating an electrode film.

FIG. 2 is a process flow diagram showing an example of a process 200 for fabricating an electrode film, according to some embodiments. In some embodiments, the process 200 for fabricating an electrode film is a dry process, where no liquids or solvents are used such that the resulting electrode film is free or substantially free of any liquids, solvents, and resulting residues. In block 202, an electrode film mixture is formed comprising carbon particles and a binder material. Optionally one or more electrical conductivity promoting additives can be combined. In some embodiments, the electrode film mixture is a dry particles mixture. In some embodiments, the binder material comprises one or more fibrillizable polymers, such as polytetrafluoroethylene (PTFE) and ultra-high molecular weight polyethylene (UHMWPE). In some embodiments, the binder material consists or consists essentially of one type of polymer, such as PTFE. In some embodiments, the electrical conductivity promoting additive can be one or more conductive carbons. For example, the conductive carbon can include one or more types of carbon black and/or graphite described herein.

In block 204, the binder in the electrode film mixture can be super-fibrillized to form a super-fibrillized matrix. The super-fibrillization process can be performed using a conventional fibrillization process, with reduced speed and/or increased process pressure. For example, the super-fibrillization process may be performed with reduced speed and/or reduced pressure relative to that described in U.S. Patent Publication No. 2015/0072234. In some embodiments, the super-fibrillization process can be a mechanical shearing process. For example, mechanical shearing force can be applied to the binder material to manipulate the binder material such that a plurality of fibrils can be formed from the binder material. In some embodiments, the mechanical shearing process comprises a blending and/or a milling process. For example, the speed with which particles of the electrode film mixture are fed or cycled through the blender and/or mill may be reduced during the super-fibrillization process. Reducing the speed with which particles of the electrode film mixture are cycled through the blender and/or mill may increase the duration in which the particles of the electrode film mixture are cycled once within the process chamber of the blender and/or mill. In some embodiments, increased duration of the cycle can increase fibrillization of the binder material, providing super-fibrillization of the mixture. In some embodiments, the speed with which the particles of the electrode film mixture are cycled within the blender and/or mill is selected such that the duration in which the particles are cycled once within the process chamber is about 1.2 times to about 3 times that of conventional dry electrode processes. For example, the duration of a blending and/or a milling process for a conventional dry process can be about 1 minute. In some embodiments, the duration of blending and/or milling is about 2 minutes, about 3 minutes, about 4 minutes, about 5 minutes, about 7 minutes, or about 10 minutes. The feed rate of blending and/or milling can be reduced relative to conventional dry electrode processing procedures, for example, by about half. In some embodiments, the feed rate of blending and/or milling is about 10% of the rated machine feed rate, about 20% of the rated machine feed rate, about 30% of the rated machine feed rate, about 40% of the rated machine feed rate, about 50% of the rated machine feed rate, about 60% of the rated machine feed rate, about 70% of the rated machine feed rate, about 80% of the rated machine feed rate, or about 90% of the rated machine feed rate. In some embodiments, an electrode film is provided, wherein the electrode film is prepared by a process comprising blending and/or milling a dry mixture of carbon particles and binder for about 2 to about 5 minutes.

In some embodiments, a continuous mixing process can be used. In such embodiments, the duration of blending and/or milling can be inversely related to the feed rate. Thus, in such embodiments, feed rate can be reduced compared to a conventional dry fibrillization process to increase the duration of blending and/or milling. In some embodiments, reducing the feed rate to half will double blending and/or milling duration. For example, the feed rate for a conventional dry process on certain machinery can be about 50-60 kg/hr. Thus, in some embodiments, a super-fibillized binder or matrix as provided herein can be produced at a feed rate of about 25-30 kg/hr on the same machinery. Generally, the feed rate is dependent on the milling machinery, and can be adjusted based on the machine operating parameters in view of guidance provided herein. In further embodiments, equipment with larger channels can be used to increase the duration of blending and/or milling. When a batch blending and/or milling process is used, the duration can be increased simply by blending and/or milling for a longer time.

In some embodiments, the process pressure within the blender and/or mill during the fibrillization process may be increased to provide super-fibrillization. In some embodiments, increased process pressure facilitates increased shearing force exerted upon the binder material, thereby increasing fibrillization of the binder material. In some embodiments, the process pressure during the super-fibrillization process can be selected such that the shearing force exerted upon the binder material is about 1.2 times to about 3 times that of conventional dry electrode fibrillization processes.

A super-fibrillization process comprising reduced speed and/or increased process pressure may facilitate increased fibrillization of the binder material, such that an increased number of fibrils, greater fibril surface area, and/or longer fibrils being formed from the binder material. In some embodiments, the reduced speed and/or increased process pressure facilitates increased formation of fibrils such that a reduced quantity of binder material can be used to form the electrode film having the desired resistance to a tensile, shear, compressive, and/or twisting stress. For example, the reduced speed and/or increased process pressure may facilitate formation of sufficient fibrils such that desired mechanical support can be provided for one or more other components of the film while using a reduced quantity of binder material. In some embodiments, the combining step of block 202 and fibrillization step of block 204 may be one or substantially one continuous step.

In certain embodiments, the super-fibrillization provided by block 204 can be performed by repeating a conventional fibrillization processes two or more times on the same material. In such embodiments, a fibrillized matrix can be formed through a first fibrillization process. The fibrillized matrix may then be reduced in size, for example, to form a first powdered electrode film mixture. For example, block 204 can comprise the step of destructing the first fibrillized electrode film mixture. Destructuring the electrode film mixture can comprise passing the fibrillized electrode film mixture through a strainer, sifter, mesh, riddle, screen and/or sieve. The destructured fibrillized electrode film mixture can then be super-fibrillized, by subjecting it to a second fibrillization step as provided herein. The second fibrillization step can be a fibrillization process performed with reduced speed and/or increased process pressure as provided herein. The second fibrillization step can result in a second powdered electrode film mixture. The second powdered electrode film mixture can then be subjected to further iterations of the step(s) of block 204, or in turn to the step(s) of block 206. In some embodiments, the second (or additional) fibrillization step(s) provides an electrode film mixture with increased fibrillization and one or more advantages resulting therefrom, as provided herein. Thus, the super-fibrillization of the binder in block 204 can occur after one, two, three, or more fibrillization sub-steps. The end result, is that block 204 provides a super-fibrillized matrix, and/or super-fibrillized binder particles, as provided herein.

In block 206, the fibrillized electrode film mixture can be calendared in a calendar apparatus to form a free-standing super-fibrillized electrode film. A calendar apparatus is well known in the art, and generally includes a pair of calendar rolls between which raw material, such as an electrode film mixture is fed, to form an electrode film. In some embodiments, an electrode film can be formed in a first calendaring step, without additional calendaring steps, to form a film at a desired minimum thickness, as described further herein. In some embodiments, the calendared mixture forms a free-standing dry particles film free or substantially free from any liquids, solvents, and resulting residue therefrom. In some embodiments, the electrode film is an anode electrode film. In some embodiments, the electrode film is a cathode electrode film. In some embodiments, the super-fibrillized electrode film mixture can be calendared under selected conditions. For example, in further embodiments, calendaring can be performed at a temperature of 10 to 300° C., at a pressure of 5 to 150 kilo newton force. The calendar can be a size selected for a particular application, but generally can have a diameter in the range of 5 to 80 cm.

FIG. 3 is a table listing respective equivalent series resistance performance of lithium ion capacitor cells including anodes comprising different types of electrical conductivity promoting additives. The table lists the type of electrical conductivity promoting additive included in each of the capacitor anodes, and the corresponding equivalent series resistance performance is listed as a percentage improvement relative to a lithium ion capacitor without any of the electrical conductivity promoting additives. The electrical conductivity promoting additive tested included mesoporous carbon, and various types of conductive carbons. As shown in the table of FIG. 3, shows that lithium ion capacitors with an anode comprising certain types of conductive carbons demonstrated improved equivalent series resistance performance, while lithium ion capacitors with an anode comprising mesoporous carbon did not demonstrate significant improvement in equivalent series resistance performance. For example, lithium ion capacitors with an anode comprising certain types of conductive carbons demonstrated 5% or more improvement in equivalent series resistance performance.

Tests also showed that lithium ion capacitors with an anode comprising metal powders such as silver (Ag) powder, nickel (Ni) powder, or copper (Cu) powder did not demonstrate significant improvement in equivalent series resistance performance.

Figure 4:
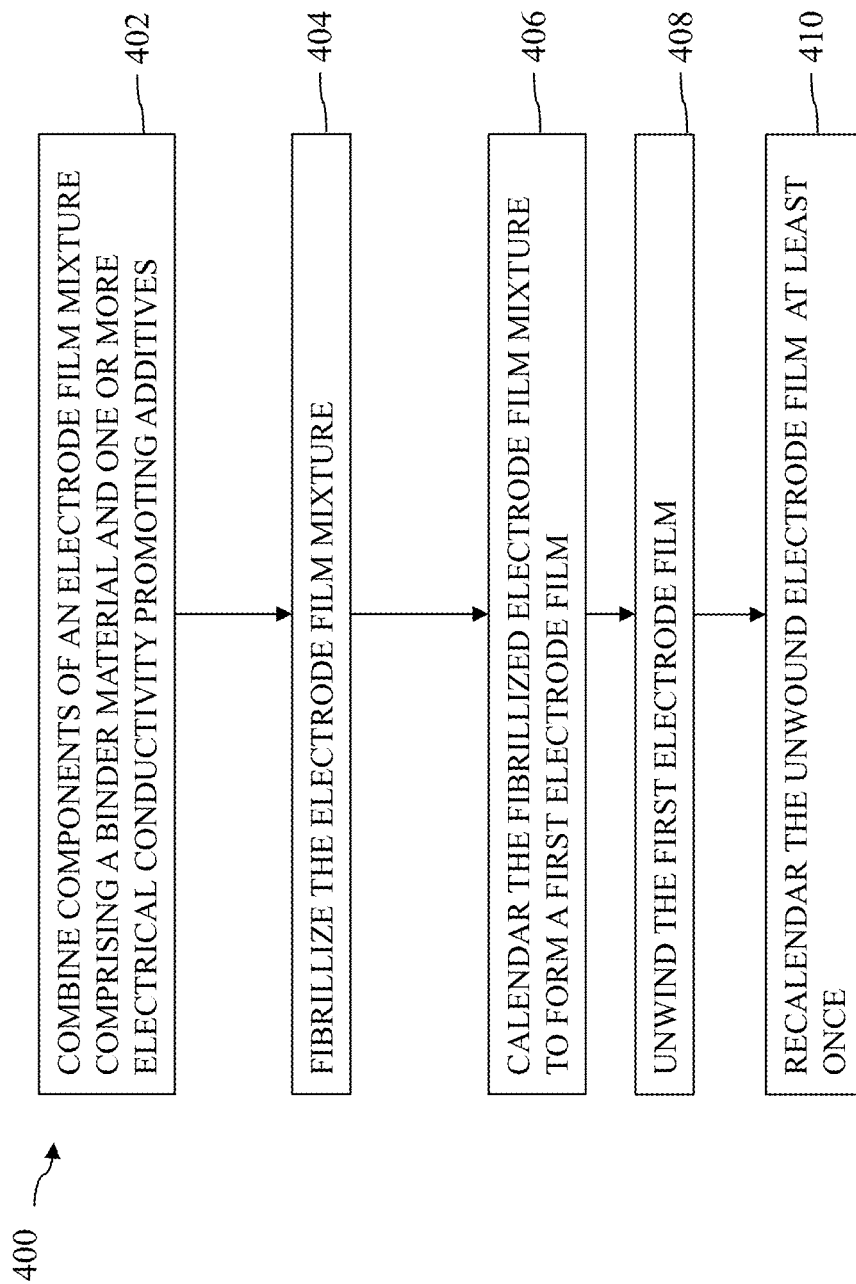
FIG. 4 is a process flow diagram showing an example of a process for fabricating an electrode film with reduced thickness.

FIG. 4 is a process flow diagram showing an example of a process 400 for fabricating an electrode film with a reduced thickness, according to some embodiments. In some embodiments, the electrode film can be a cathode electrode film. In some embodiments, the electrode film can be an anode electrode film. In some embodiments, the process 400 for fabricating an electrode film is a dry process, where no liquids or solvents are used such that the resulting electrode film is free or substantially free of any liquids, solvents, and resulting residues. In some embodiments, the process 400 can be applied to form electrodes of ultracapacitors, batteries, and/or lithium ion capacitors.

In block 402, components of an electrode film mixture comprising a binder material and one or more electrical conductivity promoting additives can be combined. In some embodiments, the electrode film mixture is a dry particles mixture. The binder material may comprise one or more fibrillizable polymers, such as polytetrafluoroethylene (PTFE) and ultra-high molecular weight polyethylene (UHMWPE). In some embodiments, the binder material consists or consists essentially of one type of polymer, such as PTFE. In some embodiments, the electrical conductivity promoting additive can be one or more conductive carbons. For example, the conductive carbon can include one or more types of carbon black and/or graphite described herein.

In block 404, the electrode film mixture can be fibrillized to form fibrils from the binder material. The fibrillization process can be performed with reduced speed and/or increased process pressure. The reduced speed and/or increased process pressure may facilitate increased formation of fibrils such that a reduced quantity of binder material can be used to form the electrode film having the desired resistance to a tensile, shear, compressive, and/or twisting stress. As described herein, in some embodiments, the fibrillization process can be mechanical shearing process, for example, comprising a blending and/or a milling process. In some embodiments, the speed with which particles of the electrode film mixture are cycled through the blender and/or mill may be reduced during the fibrillization process. In some embodiments, the process pressure within the blender and/or mill during the fibrillization process may be increased. In some embodiments, the combining step of block 402 and fibrillization step of block 404 may be one or substantially one continuous step. The reduced speed and/or increased process pressure can allow an electrode film with the aforementioned greater strength to be manufactured at a thickness lower than previously possible, such as lower than 120 μm or otherwise described herein, either through a single, higher pressure calendaring process (in a single step), or through multiple calendaring steps, for example, where the film is unwound, and subsequently re-calendared, one or more times after an initial calendaring step.

In certain embodiments, block 404 can comprise the step of reducing in size, for example, destructuring, the fibrillized electrode film mixture, and re-fibrillizing it, such as that described with reference to block 204 in FIG. 2. In block 406, the fibrillized electrode film mixture can be calendared to form a first electrode film. In block 408, the first electrode film can be unwound. For example, the first electrode film can be run through an unwinder, such as the unwinder shown in FIGS. 5A and 5B described below. In block 410, the unwound electrode film can be recalendared at least once. In some embodiments, the electrode film can be recalendared two or more times to form an electrode film having a reduced thickness, such as a thickness of about 50 μm, or less, or the other reduced thicknesses described herein. In some embodiments, the electrode film with the reduced thickness is a free-standing dry particles electrode film which can demonstrate desired resistance to a tensile, shear, compressive, and/or twisting stress. For example, an electrode film, such as an anode electrode film of a lithium ion capacitor subjected to one pass through the calendaring line may have a thickness of about 120 μm. The electrode film implemented with the increased fibrillization described herein can have increased strength to allow the calendared electrode film to be unwound, and run through the calendar line, one or more additional, to reach a thickness below about 120 μm. For example, the film can be calendared a second time to a lower thickness, such as a thickness of about or below 80 μm. The recalendared anode electrode film may be unwound and run through the calendar line a third time to form an electrode film having a thickness of about 50 μm.

In some embodiments, an electrode film having a thickness less than 80 μm, or other reduced thicknesses described herein, relative to conventional electrode film thicknesses, can be fabricated by running an electrode film mixture with super-fibrillized binder only once through a calendar line. For example, the calendar may exert sufficient pressure upon the electrode film mixture such that a thickness of less than 80 μm can be achieved by calendaring the mixture only once, due to the higher strength of the film due to its higher fibrillization. Achieving electrode films having the desired reduced thickness by passing the electrode film mixture through the calendar machine only once can provide a cheaper and/or higher speed fabrication process.

Figure 5A:
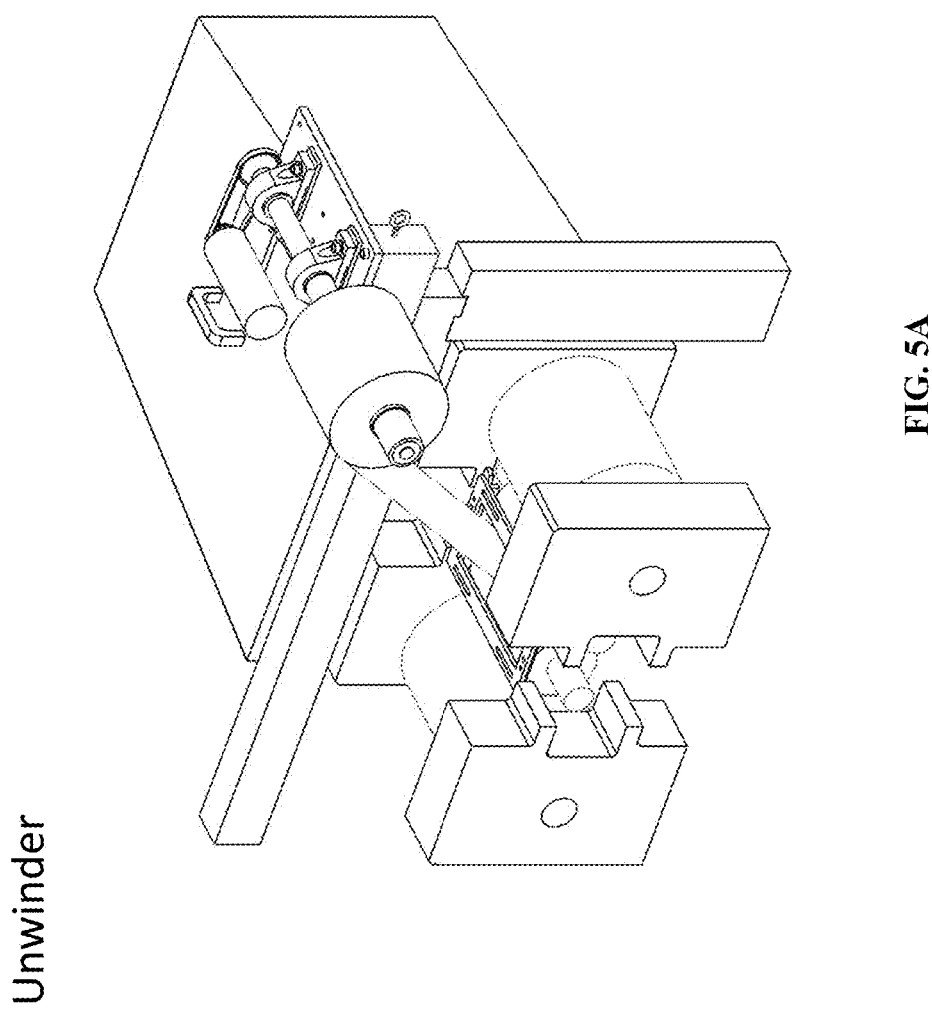
FIG. 5A is a schematic diagram of an unwinder machine for the electrode film calendar line.
Figure 5B:
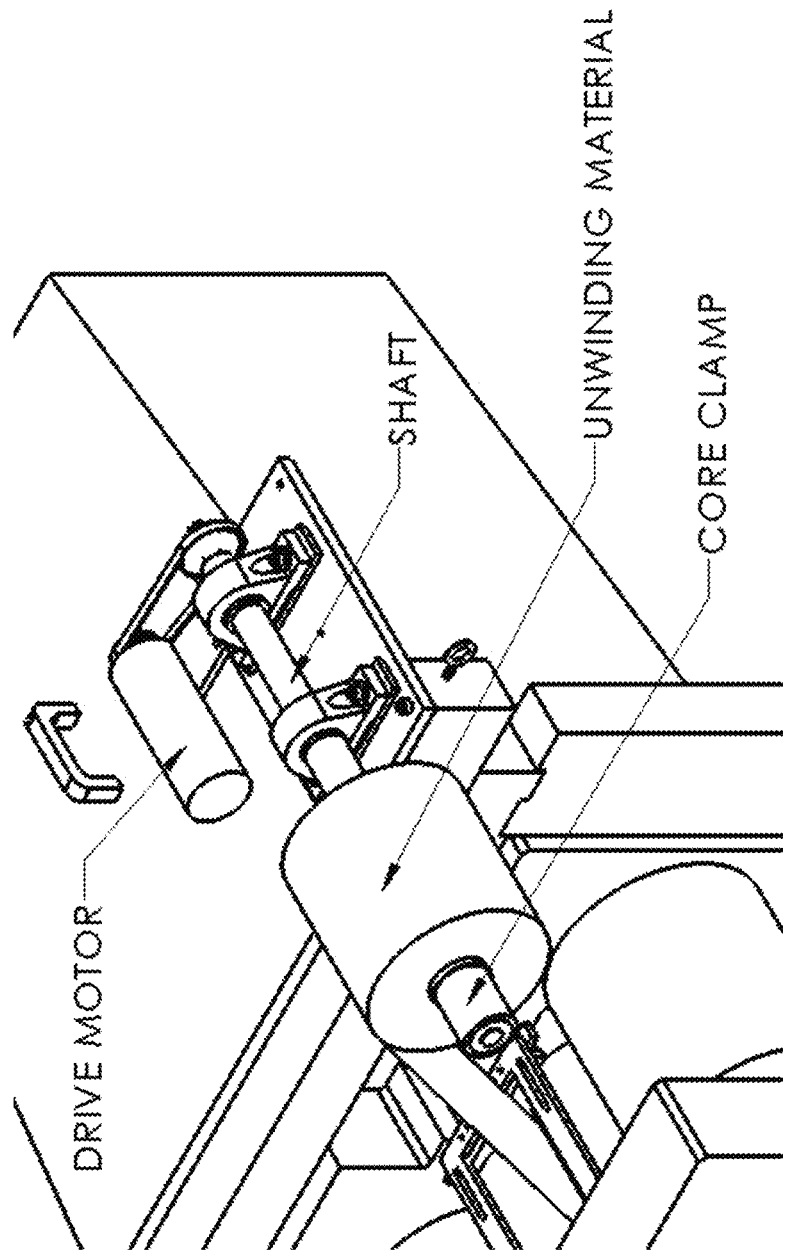
FIG. 5B is a more detailed schematic view of a portion of the unwinder machine shown in FIG. 5A.

FIG. 5A is a schematic diagram of an embodiment of an unwinder machine for the electrode film calendar line. FIG. 5B is a more detailed schematic view of a portion of the unwinder machine shown in FIG. 5A. The equipment shown in FIGS. 5A and 5B can be used to implement the recalendaring step 410 of FIG. 4. For example, in the illustrated embodiment, a free-standing dry electrode film (shown in FIG. 5B as "unwinding material) is unwound and re-calendered in the pair of rollers shown. It will be understood that similar calendaring equipment such as the rollers shown in FIGS. 5A and 5B can be implemented to receive and compress a dry electrode mixture and initially form the free-standing dry electrode film in a first calendaring step, such as step 206 in FIG. 2, and step 410 of FIG. 4, or other embodiments.

Figure 6A:
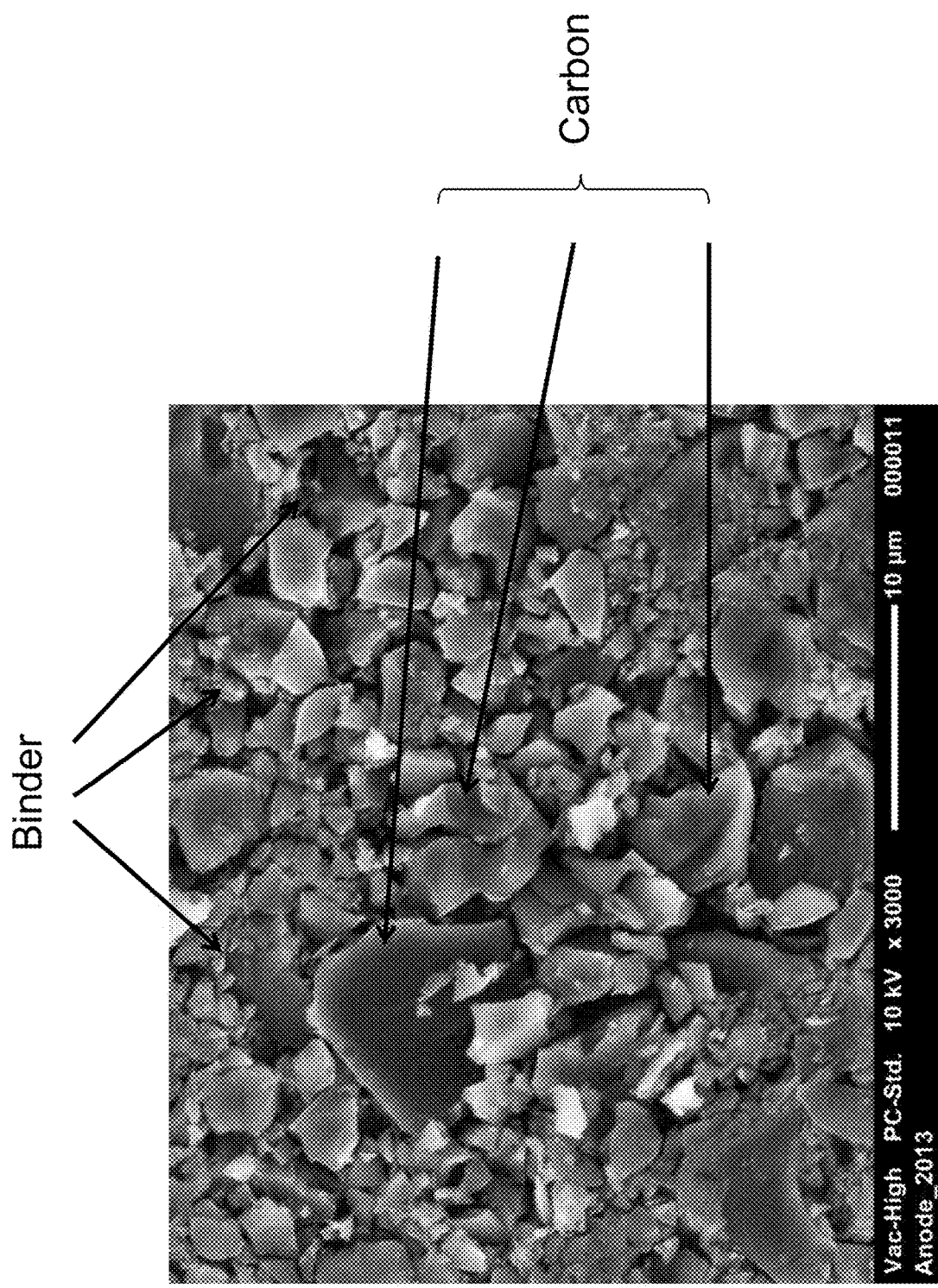
FIGS. 6A and 6B depict SEM images of electrode films prepared by a dry electrode process known in the art (FIG. 6A) and by a dry electrode process implementing super-fibrillized binder (FIG. 6B), respectively.
Figure 6B:
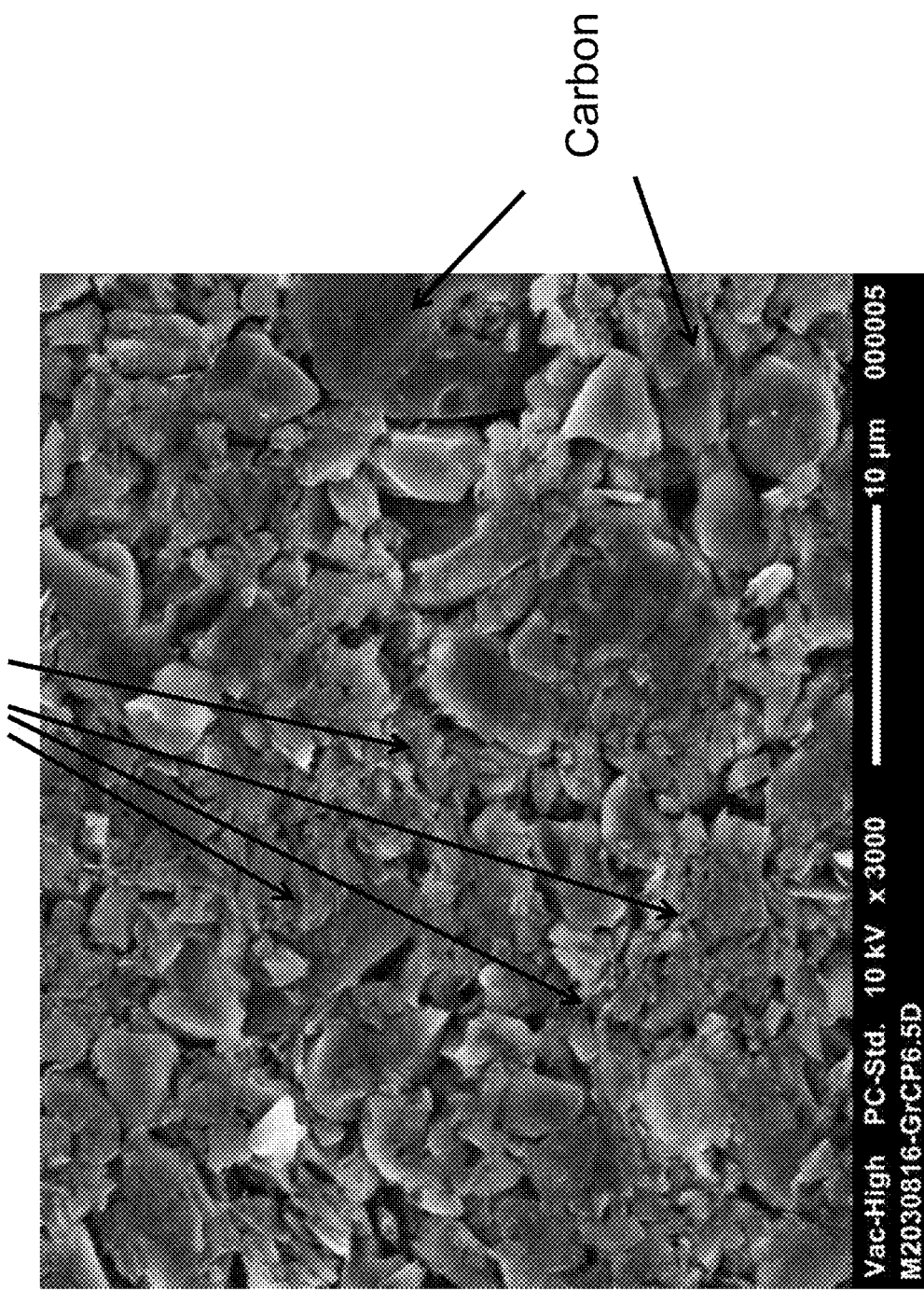

FIG. 6A and FIG. 6B show SEM images of dry electrode films matrices. FIG. 6A shows an SEM image of a dry electrode film matrix fabricated by a conventional dry electrode process. FIG. 6B shows a dry electrode film matrix fabricated according to a super-fibrillization process, such as process 200 or others described herein. The electrode film in FIG. 6A contains 8% of binder and has a thickness of 80 μm. The electrode film in FIG. 6B contains 6.5% of binder, has a thickness of 50 μm. The electrode film in FIG. 6B was fabricated from an electrode film mixture that was subjected to a second milling process. As can be seen by comparison of FIG. 6A and FIG. 6B, the dry electrode film matrix of FIG. 6B is characterized by increased binder fibrillization. Specifically, in FIG. 6B, an increased number of fibrils are present. In FIG. 6A, a substantial portion of the carbon particles (labeled as such) have free surfaces, while in FIG. 6B, fibrillized binder coats a substantially increased surface area of the carbon particles. Generally, the binder depicted in FIG. 6B has a greater surface area for the same mass, and makes contact with a greater surface area of the carbon particles, than the binder in FIG. 6A. The binder in FIG. 6B is an example of a super-fibrillized binder as provided herein.

FIG. 7 provides tabular data regarding binder loading, film thicknesses, cell capacitance, and ESR for various embodiments of lithium ion capacitors having an anode created by the methods provided herein.

Although this invention has been disclosed in the context of certain embodiments and examples, it will be understood by those skilled in the art that the invention extends beyond the specifically disclosed embodiments to other alternative embodiments and/or uses of the invention and obvious modifications and equivalents thereof. In addition, while several variations of the embodiments of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the embodiments of the disclosed invention. Thus, it is intended that the scope of the invention herein disclosed should not be limited by the particular embodiments described above.

The headings provided herein, if any, are for convenience only and do not necessarily affect the scope or meaning of the devices and methods disclosed herein.

What is claimed is:

1. An electrode film for use in an energy storage device comprising:
    dry carbon particles; and
    dry super-fibrillized binder particles;
    wherein the electrode film comprises a super-fibrillized matrix;
    wherein the electrode film is a dry free-standing super-fibrillized electrode film substantially free of solvent residue; and
    wherein the super-fibrillized matrix comprises carbon particles each having a surface area of at least 10% in contact with the dry super-fibrillized binder particles.

2. The electrode film of claim 1, wherein the electrode film has a thickness of about 50 µm to about 120 µm.

3. The electrode film of claim 1, wherein the electrode film further comprises a conductive carbon.

4. The electrode film of claim 3, wherein the electrode film comprises the conductive carbon in about 1% to about 5% by mass.

5. The electrode film of claim 1, wherein the dry super-fibrillized binder particles comprise about 5 wt % to about 7 wt % of the super-fibrillized matrix.

6. An electrode comprising a current collector and the electrode film of claim 1.

7. The electrode of claim 6, wherein the electrode is an anode.

8. An energy storage device comprising the electrode of claim 6.

9. The energy storage device of claim 8, wherein the electrode is in ionic contact with an electrolyte comprising a lithium salt.

10. The energy storage device of claim 8, wherein the energy storage device is a battery.

11. The electrode film of claim 1, wherein the electrode film does not substantially comprise processing additives.

12. The electrode film of claim 1, wherein the dry super-fibrillized binder particles comprise a binder selected from the group consisting of polytetrafluoroethylene (PTFE), ultra-high molecular weight polyethylene (UHMWPE), and combinations thereof.

13. The electrode film of claim 1, wherein the super-fibrillized binder particles comprise a greatest dimension of at most about 3 µm.

14. The electrode film of claim 13, wherein the greatest dimension of the super-fibrillized binder particles is at most about 0.01 µm to about 3 µm.

15. The electrode film of claim 1, wherein the super-fibrillized matrix comprises carbon particles each having a surface area of at least 20% in contact with the dry super-fibrillized binder particles.

16. The electrode film of claim 1, wherein the electrode film comprises the dry super-fibrillized binder particles in about 1 wt % to about 10 wt %.

17. The electrode film of claim 16, wherein the electrode film comprises the dry super-fibrillized binder particles in about 5 wt % to about 7 wt %.

18. The electrode film of claim 1, wherein the dry carbon particles comprise a porous carbon material.

19. The electrode film of claim 18, wherein the porous carbon material is selected from the group consisting of an activated carbon, a porous graphite, and combinations thereof.

20. The electrode film of claim 3, wherein the conductive carbon is selected from the group consisting of a carbon black, a conductive graphite, and combinations thereof.

* * * * *